UNITED STATES PATENT OFFICE.

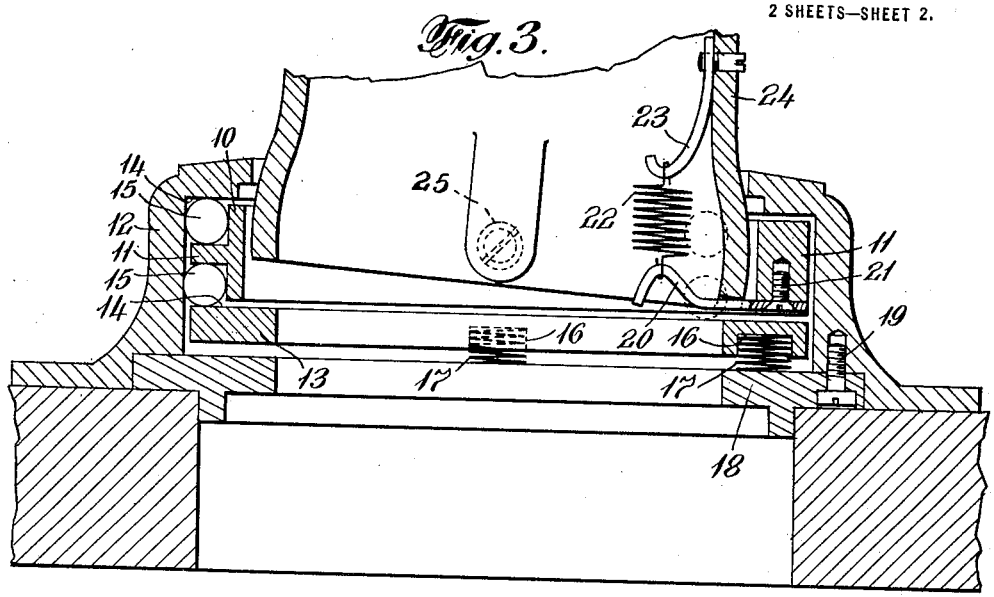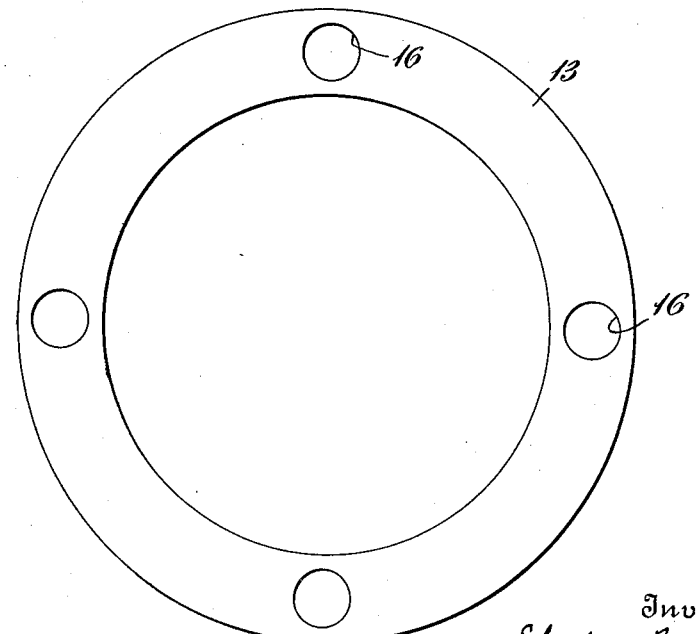

SHULAR BAUM, OF UTICA, NEW YORK.

BALL-BEARING DEVICE.

1,383,372.

Specification of Letters Patent.

Patented July 5, 1921.

Application filed May 21, 1920. Serial No. 383,100.

*To all whom it may concern:*

Be it known that I, SHULAR BAUM, a citizen of the United States, residing in the city of Utica, county of Oneida, and State of New York, have invented certain new and useful Improvements in Ball-Bearing Devices, of which the following is a full, clear, and exact specification.

My invention relates to ball-bearing devices and refers particularly to means for overcoming lost motion in such devices.

One object of my invention is a device in which the balls of a ball-bearing are maintained in contact with the walls by resilient means.

Another object of my invention is a device in which the pressure upon the balls of a ball-bearing may be varied.

Another object of my invention is a device in which a uniform pressure may be maintained upon all of the balls of a ball-bearing.

The above and other objects of my invention will be evident upon a consideration of my drawings, specification and claims.

In a ball-bearing a series of freely movable balls are maintained in a race-way or in a series of race-ways. It is evident that there should be no impediment in the way of the free movement of such balls and that they be capable of constant rotation during the operation of the device.

It is further evident that there must be constant abutment of the balls upon the walls of the race-way in order that there may be no lost motion and that the movement of the balls be constant and continuous.

The difficulty in producing the most efficient results in ball-bearings is due to the necessity of maintaining an abutment between the balls and the race-way without binding the balls and thus retarding their free movement.

The device of my invention allows of a constant abutment between the balls and the race-way without binding the balls, while at the same time it prevents any lost motion or undesirable vibration of the moving parts.

In the accompanying drawing, illustrating one form of the device of my invention, similar parts are designated by similar numerals:—

Fig. 3 is a section through the line 3—3 of Fig. 2.

Fig. 4 is a plan view of the annual member abutting upon the balls, with the springs removed.

Figure 1:
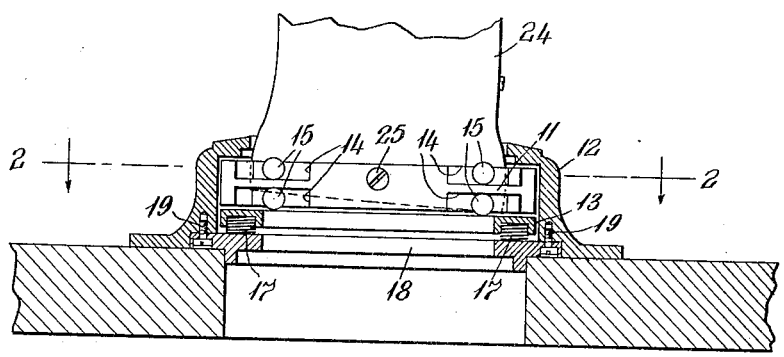
Figure 1 is a vertical section through one form of my device.
Figure 2:
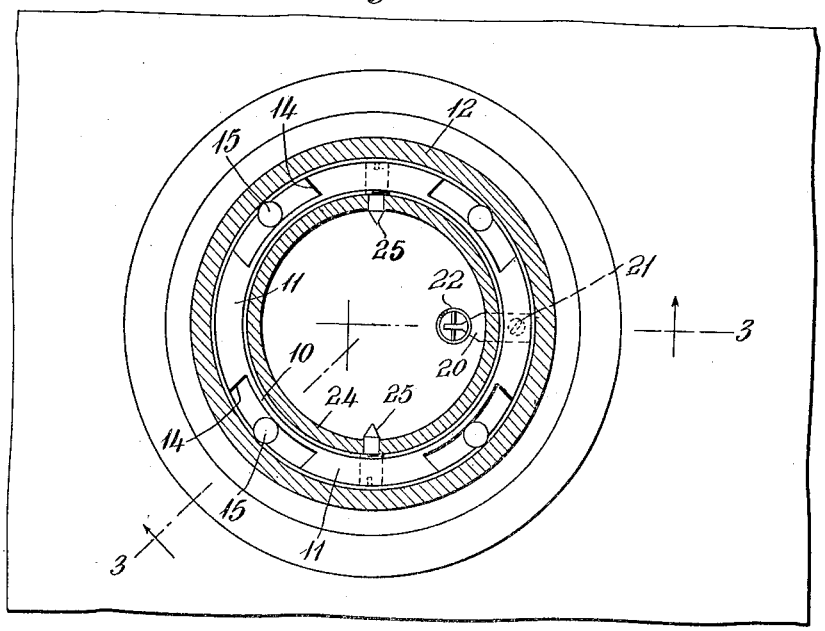
Fig. 2 is a section through the line 2—2 of Fig. 1.

In the accompanying drawings I show one form of the device of my invention in conjunction with a phonograph tone arm to illustrate its method of operation.

The device shown comprises an annular, or ring, member 10 having outwardly extended flanges 11, 11. The member 10 is surrounded by the annular tone arm base 12. Beneath the member 10 is the annular, or ring, member 13. The member 10, the flange 11, the base 12 and the member 13, thus form ball race-ways 14, 14 in which the balls 15, 15 may be rotatively carried to act as ball-bearings between the annular members. The underside of the annular member 13 contains a series of recesses 16, 16, each capable of receiving a spiral spring 17. The springs 17, 17 abut upon the annular member 18, which is attached to the tone arm base 12 by the stud screws 19, 19.

A hook member 20 is affixed to one of the flanges 11 by the stud screw 21.

A spiral spring 22, connects the hook 20 with the hook 23 connected to the tone arm 24. The tone arm 24 is pivotally carried by the annular member 10 by means of the pivots 25, 25.

It will be seen from the above that when the tone arm base 12 is maintained in a fixed position, the tone arm 24 and the member 10 will revolve together upon the series of ball bearings 15, 15 and that the tone arm 24 is pivotally attached to the member 10 and capable of limited vertical movement.

As the movement of a phonograph tone arm is delicate in its operation, it is essential that it should revolve with the greatest freedom and that there should be no unnecessary vibration, or lost motion, both of which materially affect the sound reproducing properties of the tone arm and diaphragm.

The ordinary ball bearings in which the walls of the race-way are fixed with respect to each other are not satisfactory where delicate and positive revolutions are required, because if the run-way is so close for the balls as not to allow of vibration or lost motion, it is liable to bind the balls and thus cause difficult revolution. On the other hand, if the walls are far enough apart to allow of free movement of the balls, there is liable to be vibration, or lost motion.

My device, however, allows of the most perfect freedom of movement of the balls while, at the same time, preventing all vibration and lost motion.

The resilient member 17 abutting upon the fixed member 18 and the member 13, tends to move the latter against the lower series of balls 15, 15, which is transmitted to the flanges 11, 11, the upper series of balls 15, 15 and the upper portion of the tone arm base 12, thus forming race-ways 14, 14 in which the balls 15, 15 may move with perfect freedom while, at the same time, all vibration, or lost motion, is taken up by the resilient pressure of the member 13 upon the lower series of balls 15, 15.

While I have illustrated my device in conjunction with a phonograph tone arm, I do not limit myself to this particular use, nor do I limit myself to the size, shape, number or arrangement of parts as shown and described, all of which may be varied without going beyond the scope of my invention as shown, described and claimed.

What I claim is:—

1. In a ball-bearing, in combination, an upper stationary member, an intermediate stationary member, a revoluble member positioned between the upper stationary and the intermediate stationary member and forming race-ways therewith, a lower stationary member and resilient means between the lower stationary member and the intermediate stationary member whereby the upper stationary member, the revoluble member and the intermediate stationary member will be maintained in constant abutment with balls within the race-ways.

2. In a ball-bearing, in combination, an upper stationary member, an intermediate stationary member, a revoluble member having an annular flange positioned between the upper stationary and the intermediate stationary member and forming race-ways therewith, a lower stationary member and resilient means between the intermediate stationary member and the lower stationary member whereby the upper stationary member, the revoluble member, the flange and the intermediate stationary member will be maintained in constant abutment with balls within the race-ways.

3. In a ball-bearing, in combination, an upper stationary member, an intermediate stationary member, a revoluble member positioned between the upper stationary and the intermediate stationary member and forming race-ways therewith, a tone-arm carried by the revoluble member, a lower stationary member and resilient means between the lower stationary member and the intermediate stationary member whereby the upper stationary member, the revoluble member and the intermediate stationary member will be maintained in constant abutment with balls within the race-ways.

4. In a ball-bearing, in combination, an upper stationary member, an intermediate stationary member, a revoluble member having an annular flange positioned between the upper stationary and the intermediate stationary member and forming race-ways therewith, a tone-arm carried by the revoluble member, a lower stationary member and resilient means between the intermediate stationary member and the lower stationary member whereby the upper stationary member, the revoluble member, the flange and the intermediate stationary member will be maintained in constant abutment with balls within the race-ways.

5. In a ball-bearing, in combination, an upper stationary member, an intermediate stationary member, a revoluble member positioned between the upper stationary and the intermediate stationary member and forming race-ways therewith, a tone-arm pivotally carried by the revoluble member, a lower stationary member and resilient means between the lower stationary member and the intermediate stationary member whereby the upper stationary member, the revoluble member and the intermediate stationary member will be maintained in constant abutment with balls within the race-ways.

6. In a ball-bearing, in combination, an upper stationary member, an intermediate stationary member, a revoluble member having an annular flange positioned between the upper stationary and the intermediate stationary member and forming race-ways therewith, a tone-arm pivotally carried by the revoluble member, a lower stationary member and resilient means between the intermediate stationary member and the lower stationary member whereby the upper stationary member, the revoluble member, the flange and the intermediate stationary member will be maintained in constant abutment with balls within the race-ways.

Signed at Utica in the county of Oneida and State of New York this 10 day of May, 1920.

SHULAR BAUM.